(12) United States Patent
Mori et al.

(10) Patent No.: US 12,023,760 B2
(45) Date of Patent: Jul. 2, 2024

(54) LASER MACHINING METHOD AND LASER MACHINING DEVICE

(71) Applicant: MITSUBISHI HEAVY INDUSTRIES, LTD., Tokyo (JP)

(72) Inventors: Hiroki Mori, Tokyo (JP); Saneyuki Goya, Tokyo (JP); Akiko Inoue, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 303 days.

(21) Appl. No.: 17/615,714

(22) PCT Filed: Jun. 5, 2019

(86) PCT No.: PCT/JP2019/022399
§ 371 (c)(1),
(2) Date: Dec. 1, 2021

(87) PCT Pub. No.: WO2020/245956
PCT Pub. Date: Dec. 10, 2020

(65) Prior Publication Data
US 2022/0234144 A1 Jul. 28, 2022

(51) Int. Cl.
*B23K 26/082* (2014.01)
*B23K 26/06* (2014.01)
(Continued)

(52) U.S. Cl.
CPC .......... *B23K 26/38* (2013.01); *B23K 26/0619* (2015.10); *B23K 26/402* (2013.01);
(Continued)

(58) Field of Classification Search
CPC .. B23K 26/0619; B23K 26/082; B23K 26/14; B23K 26/38; B23K 26/402;
(Continued)

(56) References Cited

U.S. PATENT DOCUMENTS

2002/0060210 A1* 5/2002 Terada .................. B23K 26/38
219/121.67 X
2003/0193117 A1* 10/2003 Schreiner ............. H05K 3/0038
264/400
(Continued)

FOREIGN PATENT DOCUMENTS

JP S63160779 A 7/1988
JP 2010082631 A 4/2010
(Continued)

OTHER PUBLICATIONS

Written Opinion of the International Searching Authority dated Sep. 3, 2019; 20pp.

*Primary Examiner* — Leo B Tentoni
(74) *Attorney, Agent, or Firm* — HAUPTMAN HAM, LLP

(57) ABSTRACT

A laser machining method performing cutting machining to cut a composite material over a thickness direction thereof by applying a laser beam to the composite material. The method includes applying the laser beam from one side in the thickness direction of the composite material so as to form a first cutout in the composite material; and applying the laser beam from the other side in the thickness direction of the composite material, forming a second cutout in the composite material at a position opposing the first cutout, connecting the second cutout to the first cutout, and cutting the composite material. The first cutout is formed by applying the laser beam through a plurality of machining paths arranged in the width direction of the first cutout. The second cutout is formed by applying the laser beam through a plurality of machining paths arranged in the width direction of the second cutout.

12 Claims, 6 Drawing Sheets

(51) Int. Cl.
    *B23K 26/14*         (2014.01)
    *B23K 26/38*         (2014.01)
    *B23K 26/402*       (2014.01)
    *B29C 69/00*         (2006.01)
    *B23K 103/16*       (2006.01)

(52) U.S. Cl.
    CPC ........ *B29C 69/001* (2013.01); *B23K 2103/16* (2018.08); *B29C 2791/009* (2013.01); *B29C 2793/0009* (2013.01)

(58) Field of Classification Search
    CPC .............. B23K 2103/16; B29C 69/001; B29C 2791/009; B29C 2793/0009
    USPC ............. 264/138, 400, 482; 425/135, 174.4; 219/121.61, 121.67
    See application file for complete search history.

(56) References Cited

U.S. PATENT DOCUMENTS

| | | | |
|---|---|---|---|
| 2019/0151996 A1* | 5/2019 | Robinson | B23K 26/0619 |
| 2019/0224784 A1* | 7/2019 | Fujiwara | B23K 26/0619 |

FOREIGN PATENT DOCUMENTS

| | | |
|---|---|---|
| JP | 2012071314 A | 4/2012 |
| JP | 2016107574 A | 6/2016 |

\* cited by examiner

LASER MACHINING METHOD AND LASER MACHINING DEVICE

RELATED APPLICATIONS

The present application is a National Phase of International Application Number PCT/JP2019/022399 filed Jun. 5, 2019.

TECHNICAL FIELD

The present invention relates to a laser machining method and a laser machining device for performing machining on a composite material by irradiating the composite material with a laser.

BACKGROUND ART

In the related art, a laser machining method for a composite material is known as follows. According to the laser machining method, a first step of irradiating a machining target site of the composite material with a high output power laser beam in a multiple line shape at a high swept speed through a plurality of paths is performed. In response to a progress of the first step, a second step of reducing a multiple line degree is performed when a machining depth gradually increases (for example, refer to PTL 1).

CITATION LIST

Patent Literature

[PTL 1] Japanese Unexamined Patent Application Publication No. 2016-107574

SUMMARY OF INVENTION

Technical Problem

According to the laser machining method in PTL 1, in the first step, machining is performed in multiple lines disposed around a machining line as a center, and in the second step, machining is performed by reducing the multiple line degree. Therefore, in the laser machining method in PTL 1, a cutting groove has a V-shape formed around the machining line as the center (that is, a tapered shape in which a groove width is narrowed as the machining depth increases). Here, when a machining object is cut by the cutting groove having the V-shape, as the machining object is thicker, a front surface side is more widely removed. Consequently, the path number of machining paths increases, and a removal amount (removal volume) increases. When the path number of machining paths increases, a time required for cutting is lengthened.

Therefore, an object of the present invention is to provide a laser machining method and a laser machining device which can reduce a removal amount and improve a machining speed.

Solution to Problem

According to the present invention, there is provided a laser machining method in which cutting machining for cutting the composite material along a thickness direction is performed by irradiating a composite material with a laser. The laser machining method includes a cutting-out step of irradiating the composite material with the laser from one side in the thickness direction of the composite material to form a first cutout in the composite material, and a cutting step of irradiating the composite material with the laser from the other side in the thickness direction of the composite material to form a second cutout at a position facing the first cutout in the composite material, and cutting the composite material by causing the second cutout to communicate with the first cutout. In the cutting-out step, the first cutout is formed by irradiating the composite material with the laser through a plurality of machining paths aligned in a width direction of the first cutout. In the cutting step, the second cutout is formed by irradiating the composite material with the laser through a plurality of machining paths aligned in a width direction of the second cutout.

In addition, according to the present invention, there is provided a laser machining device that performs cutting machining for cutting the composite material along a thickness direction by irradiating a composite material with a laser. The laser machining device includes a laser irradiation unit that irradiates the composite material with the laser, a first laser head that irradiates the composite material with the laser emitted for irradiation from the laser irradiation unit from one side in the thickness direction of the composite material, a second laser head that irradiates the composite material with the laser emitted for irradiation from the laser irradiation unit from the other side in the thickness direction of the composite material, a laser switch that switches the laser emitted for irradiation from the laser irradiation unit between the first laser head and the second laser head, a first laser scanner that scans the composite material with the laser emitted for irradiation from the first laser head, a second laser scanner that scans the composite material with the laser emitted for irradiation from the second laser head, and a control unit that controls the irradiation of the laser. The control unit performs a cutting-out step of forming a first cutout in the composite material by causing the laser switch to switch the laser to the first laser head, and irradiating the composite material with the laser from the first laser head, and a cutting step of cutting the composite material by causing the laser switch to switch the laser to the second laser head, irradiating the composite material with the laser from the second laser head, forming a second cutout at a position facing the first cutout in the composite material, and causing the second cutout to communicate with the first cutout. In the cutting-out step, the first cutout is formed by irradiating the composite material with the laser through a plurality of machining paths aligned in a width direction of the first cutout. In the cutting step, the second cutout is formed by irradiating the composite material with the laser through a plurality of machining paths aligned in a width direction of the second cutout.

In addition, according to the present invention, there is provided another laser machining device that performs cutting machining for cutting a composite material along a thickness direction by irradiating a composite material with a laser. The laser machining device includes two laser irradiation units that irradiate the composite material with the laser, a first laser head that irradiates the composite material with the laser emitted for irradiation from one of the laser irradiation units from one side in the thickness direction of the composite material, a second laser head that irradiates the composite material with the laser emitted for irradiation from the other of the laser irradiation units from the other side in the thickness direction of the composite material, a first laser scanner that scans the composite material with the laser emitted for irradiation from the first laser head, a second laser scanner that scans the composite material with the laser emitted for irradiation from the second laser head, and a control unit that controls the irradiation of the laser. The control unit performs a cutting-out step of forming a first cutout in the composite material by causing the first laser head to irradiate the composite material with the laser emitted from one of the laser irradiation units, and a cutting step of cutting the composite material by causing the second laser head to irradiate the composite material with the laser emitted from the other of the laser irradiation units, forming a second cutout at a position facing the first cutout in the composite material, and causing the second cutout to communicate with the first cutout. In the cutting-out step, the first cutout is formed by irradiating the composite material with the laser through a plurality of machining paths aligned in a width direction of the first cutout. In the cutting step, the second cutout is formed by irradiating the composite material with the laser through a plurality of machining paths aligned in a width direction of the second cutout.

According to the configurations, the composite material can be cut by forming the first cutout on one side of the composite material and forming the second cutout on the other side of the composite material. Therefore, compared to a case where the composite material is cut by irradiating the composite material with the laser from one side of the composite material, a removal amount can be reduced. Accordingly, a machining speed of cutting machining can be improved.

In addition, it is preferable to adopt a configuration as follows. The composite material is cut along a cutting line extending in a cutting progress direction. The cutting line includes a plurality of first cutout regions set to be aligned in the progress direction in which the cutting line extends, on one side in the thickness direction of the composite material, and a plurality of second cutout regions set to be aligned in the progress direction in which the cutting line extends, on the other side in the thickness direction of the composite material. In the cutting-out step, the first cutout is formed by irradiating the first cutout region with the laser. In the cutting step, the second cutout is formed by irradiating the second cutout region with the laser. The composite material is cut along the cutting line while the cutting-out step and the cutting step are alternately performed from one side toward the other side in the progress direction of the cutting line.

In addition, it is preferable to adopt a configuration as follows. The composite material is cut along a cutting line extending in a cutting progress direction. The cutting line includes a plurality of first cutout regions set to be aligned in the progress direction in which the cutting line extends, on one side in the thickness direction of the composite material, and a plurality of second cutout regions set to be aligned in the progress direction in which the cutting line extends, on the other side in the thickness direction of the composite material. In the cutting-out step, the first cutout is formed by irradiating the first cutout region with the laser. In the cutting step, the second cutout is formed by irradiating the second cutout region with the laser. The control unit cuts the composite material along the cutting line while alternately performing the cutting-out step and the cutting step from one side toward the other side in the progress direction of the cutting line by causing the laser switch to alternately switch between the first laser head and the second laser head.

According to the configurations, the cutting-out step and the cutting step are alternately performed. In this manner, the cutting-out step and the cutting step do not need to be simultaneously performed. Accordingly, it is not necessary to introduce a device for simultaneously performing the cutting-out step and the cutting step. Therefore, the machining speed of the cutting machining can be improved while a device configuration can be prevented from increasing.

In addition, it is preferable to adopt a configuration as follows. The composite material is cut along a cutting line extending in a cutting progress direction. The cutting line includes a plurality of first cutout regions set to be aligned in the progress direction in which the cutting line extends, on one side in the thickness direction of the composite material, and a plurality of second cutout regions set to be aligned in the progress direction in which the cutting line extends, on the other side in the thickness direction of the composite material. In the cutting-out step, the first cutout is formed by irradiating the first cutout region with the laser. In the cutting step, the second cutout is formed by irradiating the second cutout region with the laser. The composite material is cut along the cutting line by simultaneously performing the cutting-out step and the cutting step from one side toward the other side in the progress direction of the cutting line, and performing the cutting-out step prior to the cutting step.

In addition, it is preferable to adopt a configuration as follows. The composite material is cut along a cutting line extending in a cutting progress direction. The cutting line includes a plurality of first cutout regions set to be aligned in the progress direction in which the cutting line extends, on one side in the thickness direction of the composite material, and a plurality of second cutout regions set to be aligned in the progress direction in which the cutting line extends, on the other side in the thickness direction of the composite material. In the cutting-out step, the first cutout is formed by irradiating the first cutout region with the laser. In the cutting step, the second cutout is formed by irradiating the second cutout region with the laser. The control unit cuts the composite material along the cutting line by causing the first laser head and the second laser head to irradiate the composite material with the laser, simultaneously performing the cutting-out step and the cutting step from one side toward the other side in the progress direction of the cutting line, and performing the cutting-out step prior to the cutting step.

According to the configurations, the cutting-out step and the cutting step can be simultaneously performed. Accordingly, the machining speed of the cutting machining can be further improved.

In addition, it is preferable to adopt a configuration as follows. In the cutting step, the composite material is shielded from the laser by a receiving member that receives the laser emitted for irradiation from the other side in the thickness direction of the composite material.

According to the configuration, in the cutting step, even when the laser passes through the first cutout and one side is irradiated with the laser, the composite material is shielded from the laser by the receiving member. In this manner, it is possible to prevent one side from being irradiated with the laser.

In addition, it is preferable to adopt a configuration as follows. In the composite material, one side in the thickness direction is a lower side, and the other side in the thickness direction is an upper side. In the cutting-out step, the laser is emitted for irradiation from the lower side toward the upper side in the thickness direction of the composite material. In the cutting step, the laser is emitted for irradiation from the upper side toward the lower side in the thickness direction of the composite material.

According to the configuration, in the cutting step, the laser can be emitted for irradiation toward the lower side.

Accordingly, the laser is emitted for irradiating a ground side, and thus, the laser can be prevented from being scattered in air.

In addition, it is preferable to adopt a configuration as follows. The composite material is cut along a cutting line extending in a cutting progress direction. A machining line is set along the thickness direction of the composite material. During the cutting machining, an irradiation direction of the laser is tilted with respect to the machining line set in the composite material, in a cross section perpendicular to the progress direction.

In addition, it is preferable to adopt a configuration as follows. The composite material is cut along a cutting line extending in a cutting progress direction, and a machining line is set along a thickness direction of the composite material. The laser machining device further includes a laser tilting unit that tilts an irradiation direction of the laser with respect to the machining line set in the composite material, in a cross section perpendicular to the progress direction.

According to the configurations, the irradiation direction of the laser is tilted with respect to the machining line. In this manner, a machining surface can be prevented from being tilted with respect to the machining line, and the machining surface can be set along the machining line.

DESCRIPTION OF EMBODIMENTS

Hereinafter, embodiments according to the present invention will be described in detail with reference to the drawings. The present invention is not limited by the embodiments. In addition, configuration elements in the following embodiments include those which can be easily replaced by those skilled in the art, or those which are substantially the same. In addition, the configuration elements described below can be appropriately combined with each other, and when there are a plurality of the embodiments, the embodiments can be combined with each other.

Embodiment 1

Figure 1:
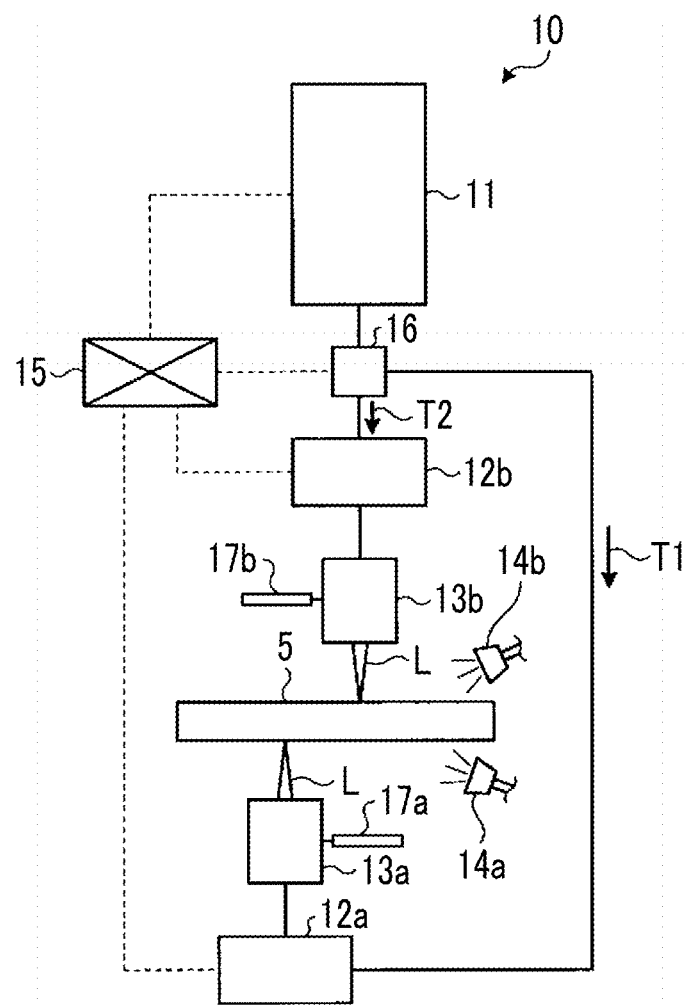
FIG. 1 is a view schematically illustrating a laser machining device according to Embodiment 1.

FIG. 1 is a view schematically illustrating a laser machining device according to Embodiment 1. As illustrated in FIG. 1, a laser machining device 10 according to Embodiment 1 is a device that can cut a composite material 5 by irradiating the composite material 5 serving as a machining object with a laser L.

For example, the composite material 5 includes fiber reinforced plastics such as carbon fiber reinforced plastic (CFRP), glass fiber reinforced plastic (GFRP), and glass long fiber reinforced plastic (GMT).

As illustrated in FIG. 1, the laser machining device 10 is configured to include a laser irradiation device 11, a laser switch 16, two scanning optical systems (laser scanners) 12a and 12b, two light condensing optical systems (laser heads) 13a and 13b, two gas nozzles 14a and 14b, two shielding plates (receiving members) 17a and 17b, and a control unit 15.

The laser irradiation device 11 is a device that outputs the laser L. The laser irradiation device 11 may use a pulse wave (continuous wave) or a continuous wave (CW) as the laser L to be output. In Embodiment 1, it is preferable to use the laser irradiation device 11 that irradiates the composite material 5 with the laser L having the continuous wave capable of continuously supplying energy. In addition, the laser irradiation device 11 may irradiate the composite material 5 with the laser L in a single mode or a multi-mode. In Embodiment 1, it is preferable to use the laser irradiation device 11 that irradiates the composite material 5 with the laser L in a single mode having a high light condensing property.

The laser switch 16 switches between light guide paths of the laser L emitted for irradiation from the laser irradiation device 11. The laser switch 16 switches the light guide path so that the laser L is oriented toward a front surface side of the composite material 5, or switches the light guide path so that the laser L is oriented toward a rear surface side of the composite material 5. Specifically, the laser switch 16 switches between a first light guide path T1 oriented toward the rear surface side of the composite material 5 and a second light guide path T2 oriented toward the front surface side of the composite material 5.

The two scanning optical systems 12a and 12b include a first scanning optical system 12a provided in the first light guide path T1 and a second scanning optical system 12b provided in the second light guide path T2. The first scanning optical system 12a is an optical system that causes the laser switch 16 to switch the first light guide path T1 so that the rear surface of the composite material 5 is scanned with the laser L passing through the first light guide path T1. The second scanning optical system 12b is an optical system that causes the laser switch 16 to switch the second light guide path T2 so that the front surface of the composite material 5 is scanned with the laser L passing through the second light guide path T2. The first scanning optical system 12a and the second scanning optical system 12b include a scanner capable of operating the laser L on the rear surface and the front surface of the composite material 5. For example, as the scanner, a galvanometer mirror is used.

The two light condensing optical systems 13a and 13b include a first light condensing optical system 13a provided in the first light guide path T1 and a second light condensing optical system 13b provided in the second light guide path T2. The first light condensing optical system 13a is an optical system that condenses the laser L emitted from the first scanning optical system 12a and irradiates the rear surface of the composite material 5 with the condensed laser L. The second light condensing optical system 13b is an optical system that condenses the laser L emitted from the second scanning optical system 12b and irradiates the front surface of the composite material 5 with the condensed laser L. The first light condensing optical system 13a and the second light condensing optical system 13b are configured to include an optical member such as a light condensing lens.

The two gas nozzles 14a and 14b include a first gas nozzle 14a provided on the rear surface side of the composite material 5 and a second gas nozzle 14b provided on the front surface side of the composite material 5. The first gas nozzle 14a injects an inactive assist gas toward the rear surface of the composite material 5. The second gas nozzle 14b injects an assist gas toward the front surface of the composite material 5. An injection direction of the assist gas is a direction intersecting with an irradiation direction of the laser L, and is a direction along the rear surface and the front surface of the composite material 5. Although illustration is omitted, the laser machining device 10 is provided with a suction port for suctioning the assist gas.

The two shielding plates 17a and 17b include a first shielding plate 17a provided on the rear surface side of the composite material 5 and a second shielding plate 17b provided on the front surface side of the composite material 5. The first shielding plate 17a is attached to the first light condensing optical system 13a, and can shield the composite material 5 from the laser L emitted from the second light condensing optical system 13b. The second shielding plate 17b is attached to the second light condensing optical system 13b, and can shield the composite material 5 from the laser L emitted from the first light condensing optical system 13a.

The control unit 15 is connected to each unit including the laser irradiation device 11, the laser switch 16, and the two scanning optical systems 12a and 12b, and controls each unit to control an operation of the laser machining device 10. For example, the control unit 15 adjusts irradiation conditions of the laser L emitted for irradiation from the laser irradiation device 11 by controlling the laser irradiation device 11. In addition, the control unit 15 performs switching control on the laser switch 16 to guide the laser L to the first light guide path T1 or the second light guide path T2. Furthermore, for example, the control unit 15 controls a scanning operation of the laser L on the front surface and the rear surface of the composite material 5 by controlling the first scanning optical system 12a and the second scanning optical system 12b.

The composite material 5 is supported at a predetermined position by a support member (not illustrated). For example, the composite material 5 is formed in a flat plate shape, and the front surface and the rear surface of the composite material 5 are substantially perpendicularly irradiated with the laser L emitted to irradiate the composite material 5. That is, an optical axis A (refer to FIG. 2) of the laser L extends along a thickness direction of the composite material 5. In addition, the front surface of the composite material 5 is an upper surface in a vertical direction, and the rear surface is a lower surface in the vertical direction. Then, the composite material 5 is supported so that the front surface and the rear surface are horizontal planes. The composite material 5 may be supported to be movable within the horizontal plane.

The laser machining device 10 configured as described above irradiates the composite material 5 with the laser L emitted from the laser irradiation device 11, and guides the laser L emitted for irradiation to the laser switch 16. The laser switch 16 guides the laser L to the first light guide path T1 or the second light guide path T2, based on the switching control performed by the control unit 15. The laser L guided to the first light guide path T1 is guided to the first scanning optical system 12a. The laser machining device 10 changes an irradiation position of the laser L on the rear surface of the composite material 5 by scanning the rear surface of the composite material 5 with the laser L incident on the first scanning optical system 12a. The laser machining device 10 causes the laser L emitted from the first scanning optical system 12a to be incident on the first light condensing optical system 13a, and irradiates the rear surface of the composite material 5 with the condensed laser L. On the other hand, the laser L guided to the second light guide path T2 is guided to the second scanning optical system 12b. The laser machining device 10 changes the irradiation position of the laser L on the front surface of the composite material 5 by scanning the front surface of the composite material 5 with the laser L incident on the second scanning optical system 12b. The laser machining device 10 causes the laser L emitted from the second scanning optical system 12b to be incident on the second light condensing optical system 13b, and irradiates the front surface of the composite material 5 with the condensed laser L.

Figure 2:
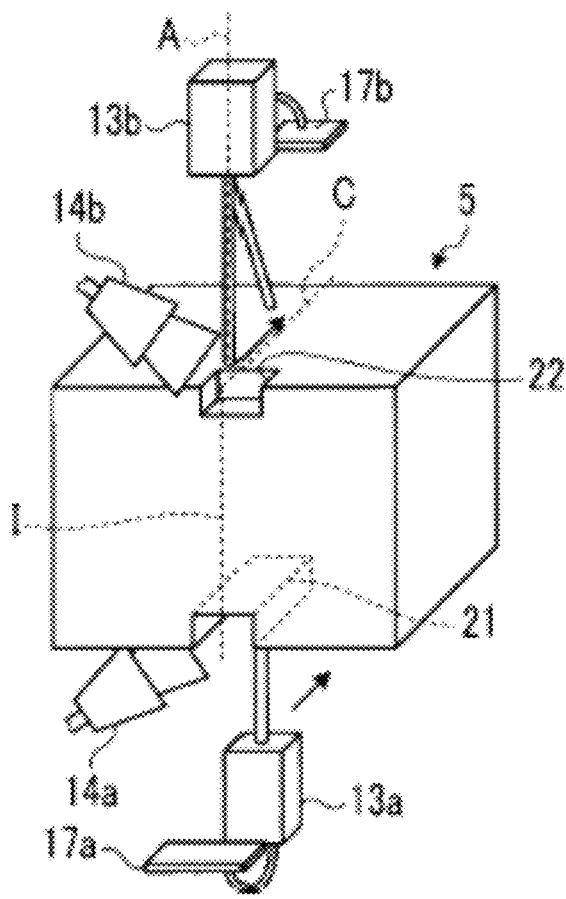
FIG. 2 is a view for describing an example relating to a laser machining method according to Embodiment 1.
Figure 3:
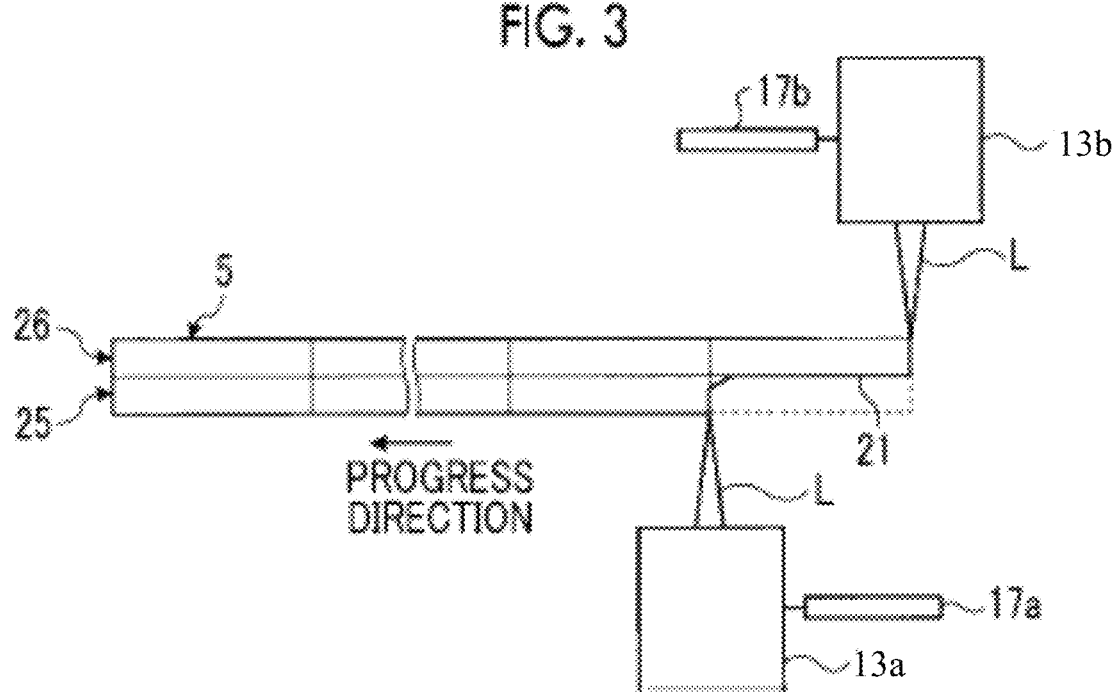
FIG. 3 is a view for describing an example relating to the laser machining method according to Embodiment 1.
Figure 4:
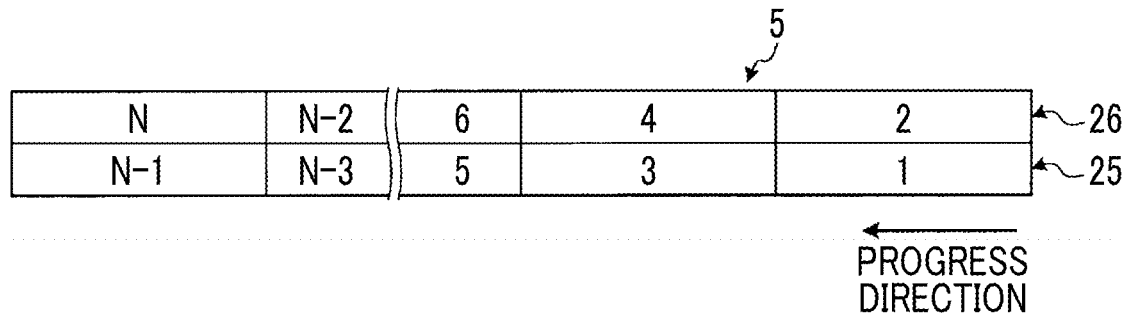
FIG. 4 is a view for describing a cutout region of the laser machining method according to Embodiment 1.

Next, a laser machining method of performing cutting machining for cutting the composite material 5 by using the above-described laser machining device 10 will be described with reference to FIGS. 2 to 4. FIG. 2 is a view for describing an example relating to the laser machining method according to Embodiment 1. FIG. 3 is a view for describing an example relating to the laser machining method according to Embodiment 1. FIG. 4 is a view for describing a cutout region of the laser machining method according to Embodiment 1. Here, for example, the composite material 5 has a plate thickness of 10 mm or larger.

In the laser machining method of Embodiment 1, the front surface and the rear surface of the composite material 5 are alternately irradiated with the laser L to cut the composite material 5. In addition, as illustrated in FIG. 2, the composite material 5 has a flat plate shape (illustration is partially omitted). In the laser machining method, a machining line I extending along a thickness direction (upward-downward direction in FIG. 2) of the composite material 5 is set in advance, and a cutting line C extending in a cutting progress direction (depth direction in FIG. 2) is set in advance in the composite material 5 before cutting machining is performed.

In the laser machining method of Embodiment 1, a cutting-out step of irradiating the above-described machining line I with the laser L toward the rear surface of the composite material 5 from a lower side in the thickness direction of the composite material 5, and a cutting step of irradiating the above-described machining line I with the laser L toward the front surface of the composite material 5 from the upper side in the thickness direction of the composite material 5 are performed. In the cutting-out step, the composite material 5 is irradiated with the laser L from the lower side in the thickness direction of the composite material 5 to form a first cutout 21 in the composite material 5 on the lower side of the machining line I. In the cutting step, the composite material 5 is irradiated with the laser L from the upper side in the thickness direction of the composite material 5 to form a second cutout 22 in the composite material 5 on the upper side of the machining line I. Then, in the cutting step, the composite material 5 is cut by causing the second cutout 22 to communicate with the first cutout 21.

In addition, in the cutting-out step, the first cutout 21 is formed by irradiating the composite material 5 with the laser L through a plurality of machining paths aligned in the width direction of the first cutout 21. The plurality of machining paths in the cutting-out step are set to be aligned in the width direction (rightward-leftward direction in FIG. 2) perpendicular to the thickness direction and the depth direction, and each of the machining paths is set to extend along the cutting line C. In this case, the plurality of machining paths are set to be aligned at a predetermined pitch interval P in the width direction. For example, the pitch interval P between the machining paths is provided at an equal interval.

Similarly, in the cutting step, the second cutout 22 is formed by irradiating the composite material 5 with the laser L through a plurality of machining paths aligned in the width direction of the second cutout 22. As in the cutting-out step, the plurality of machining paths in the cutting step are set to be aligned in the width direction, and each of machining paths is set to extend along the cutting line C. In this case, the plurality of machining paths are set to be aligned at a predetermined pitch interval P in the width direction. For example, the pitch interval P between the machining paths is provided at an equal interval.

In addition, as illustrated in FIGS. 3 and 4, in the laser machining method of Embodiment 1, a first cutout region 25 corresponding to the first cutout 21 and a second cutout region 26 corresponding to the second cutout 22 are set in the cutting line C.

A plurality of the first cutout regions 25 are set to be aligned in the progress direction in which the cutting line C extends, on the lower side in the thickness direction of the composite material 5. The plurality of first cutout regions 25 are regions having the same size. The first cutout region 25 has a length which is a half of the thickness of the composite material 5 in the thickness direction of the composite material 5.

A plurality of the second cutout regions 26 are set to be aligned in the progress direction in which the cutting line C extends, on the upper side in the thickness direction of the composite material 5. The plurality of second cutout regions 26 are regions having the same size, and are regions having a size the same as that of the first cutout region 25. Therefore, the second cutout region 26 also has a length which is a half of the thickness of the composite material 5 in the thickness direction of the composite material 5.

The first cutout region 25 and the second cutout region 26 are disposed in a grid pattern within a plane including the machining line I and the cutting line C. The first cutout region 25 and the second cutout region 26 may partially overlap each other in the center in the thickness direction of the composite material 5.

Then, during the cutting machining, the cutting-out step and the cutting step are performed, based on the machining line I, the cutting line C, and the plurality of machining paths which are set as described above. As illustrated in FIG. 4, during the cutting machining, the composite material 5 is cut along the cutting line C while the cutting-out step and the cutting step are alternately performed from one side (right side in FIG. 4) toward the other side (left side in FIG. 4) in the progress direction of the cutting line C.

Specifically, during the cutting machining, the laser switch 16 first guides the laser L to the first light guide path T1. Then, the cutting-out step is performed on the first cutout region 25 ("1" in FIG. 4) on the right side in FIG. 4 of the cutting line C, thereby forming the first cutout 21. Subsequently, during the cutting machining, the laser switch 16 guides the laser L to the second light guide path T2. Then, the cutting step is performed on the second cutout region 26 ("2" in FIG. 4) on the right side in FIG. 4 of the cutting line C, that is, on the second cutout region 26 at a position facing the first cutout 21, thereby forming the second cutout 22. In the cutting step, even when the laser L passes through the first cutout 21, the composite material 5 is shielded from the laser L by the second shielding plate 17b. In addition, in the cutting-out step, the laser L does not pass through the composite material 5. However, for safety, the first shielding plate 17a is provided.

Thereafter, in the cutting step, the laser L is switched to the first light guide path T1 by the laser switch 16, and the cutting-out step is performed again on the first cutout region 25 ("3" in FIG. 4) adjacent to the first cutout 21 of the cutting line C, thereby forming the first cutout 21. Subsequently, in the cutting step, the laser L is switched to the second light guide path T2 by the laser switch 16, and the cutting step is performed on the second cutout region 26 ("4" in FIG. 4) at a position facing the first cutout 21, thereby forming the second cutout 22. Then, in the cutting step, the composite material 5 is cut on the cutting line C by performing the cutting-out step and the cutting step a plurality of times (N times).

Figure 5:
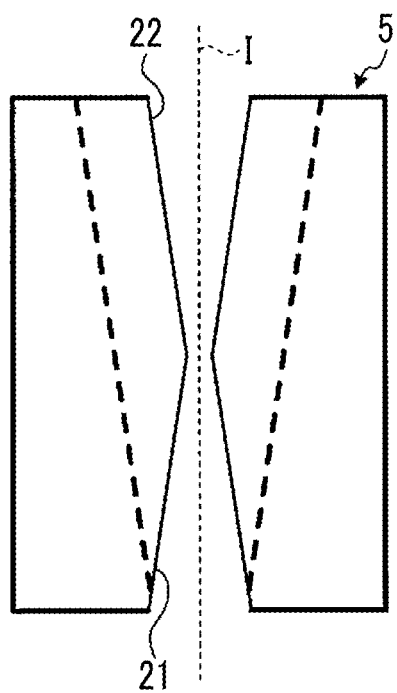
FIG. 5 is a sectional view of a composite material cut by the laser machining method according to Embodiment 1.

Since the cutting machining is performed as described above, a cutting surface perpendicular to the cutting line C of the composite material 5 is formed as illustrated in FIG. 5. As illustrated in FIG. 5, the first cutout 21 and the second cutout 22 which are formed along the machining line I are formed in a tapered shape tapered toward the center in the thickness direction of the composite material 5. A removal amount in this case has a volume in which the first cutout 21 and the second cutout 22 are formed. On the other hand, a dotted line illustrated in FIG. 5 is a cutout formed during the cutting machining in the related art, that is, the cutting machining for cutting the composite material 5 by irradiating the composite material 5 with the laser L from one side surface of the composite material 5. The cutout is formed in a tapered shape tapered from the front surface toward the rear surface of the composite material 5. The removal amount removed during the cutting machining in the related art is larger than the removal amount in Embodiment 1.

As described above, according to Embodiment 1, the composite material 5 can be cut by forming the first cutout 21 on the lower side of the composite material 5, and forming the second cutout 22 on the upper side of the composite material 5. Therefore, compared to a case where the composite material 5 is cut by irradiating the composite material 5 with the laser L from one side of the composite material 5, the removal amount can be reduced. Accordingly, a machining speed of the cutting machining can be improved.

In addition, according to Embodiment 1, the cutting-out step and the cutting step are alternately performed. In this manner, the cutting-out step and the cutting step do not need to be simultaneously performed. Accordingly, it is not necessary to introduce a device for simultaneously performing the cutting-out step and the cutting step. Therefore, the machining speed of the cutting machining can be improved while a device configuration of the laser machining device 10 can be prevented from increasing.

In addition, according to Embodiment 1, in the cutting step, even when the laser L passing through the first cutout 21 is emitted for irradiating the lower side, the composite material 5 is shielded from the laser L by the second shielding plate 17b. In this manner, the lower side can be prevented from being irradiated with the laser L.

In addition, according to Embodiment 1, in the cutting step, the laser L can be emitted for irradiation toward the lower side. Accordingly, the laser L is emitted for irradiating a ground side, and thus, the laser L can be prevented from being scattered in air.

Embodiment 2

Figure 6:
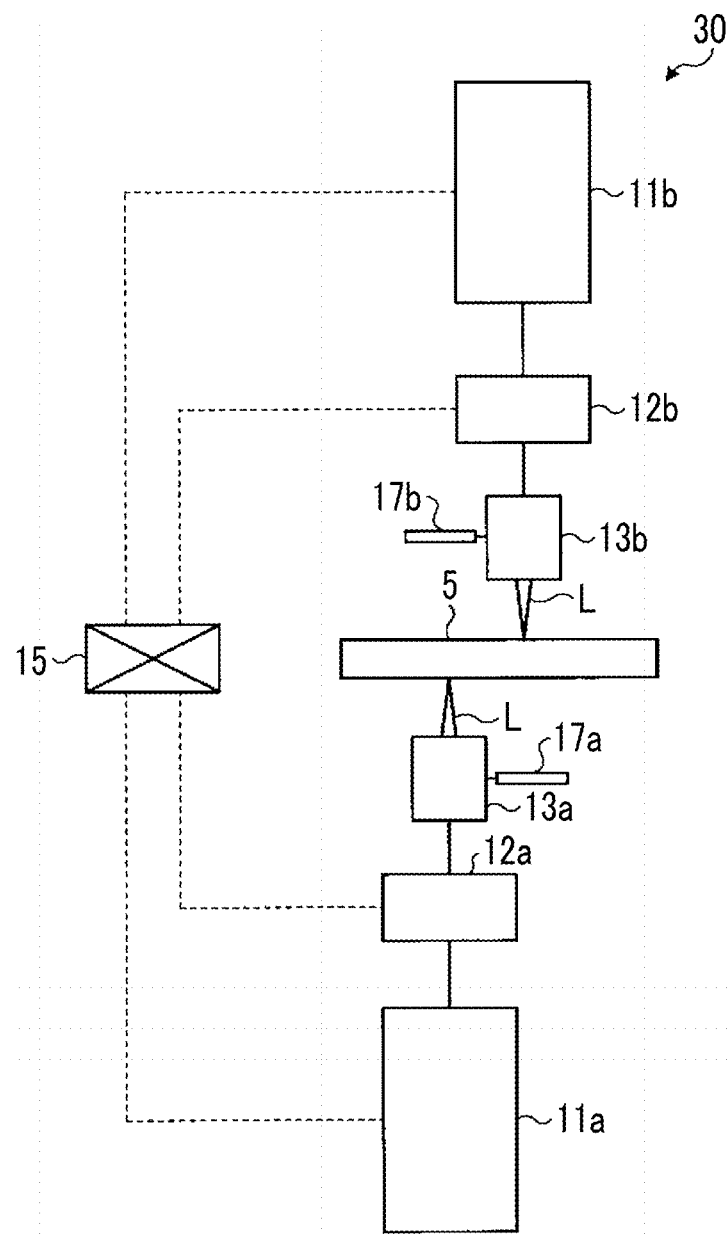
FIG. 6 is a view schematically illustrating a laser machining device according to Embodiment 2.
Figure 7:
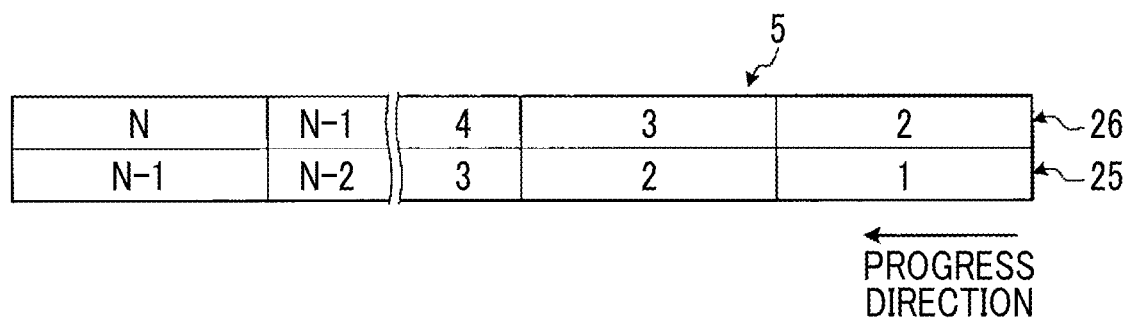
FIG. 7 is a view for describing a cutout region of a laser machining method according to Embodiment 2.

Next, a laser machining device and a laser machining method according to Embodiment 2 will be described with reference to FIGS. 6 and 7. In Embodiment 2, in order to avoid repeated description, elements different from those in Embodiment 1 will be described, and description will be made by assigning the same reference numerals to elements having configurations the same as those in Embodiment 1. FIG. 6 is a view schematically illustrating the laser machining device according to Embodiment 2. FIG. 7 is a view for describing a cutout region of the laser machining method according to Embodiment 2.

In the laser machining device and the laser machining method of Embodiment 1, the composite material 5 is cut along the cutting line C while the cutting-out step and the cutting step are alternately performed. In contrast, in the laser machining device and the laser machining method of Embodiment 2, the composite material 5 is cut along the cutting line C while the cutting-out step and the cutting step are simultaneously performed.

As illustrated in FIG. 6, a laser machining device 30 of Embodiment 2 includes two laser irradiation devices 11a and 11b, the two scanning optical systems 12a and 12b, the two light condensing optical systems 13a and 13b, the two gas nozzles 14a and 14b, the two shielding plates 17a and 17b, and the control unit 15. The two scanning optical systems 12a and 12b, the two light condensing optical systems 13a and 13b, the two gas nozzles 14a and 14b, and the two shielding plates 17a and 17b are the same as those in Embodiment 1. Accordingly, description thereof will be omitted. In addition, the laser machining device 30 of Embodiment 2 has a configuration from which the laser switch 16 provided in the laser machining device 10 of Embodiment 1 is omitted.

The two laser irradiation devices 11a and 11b include a first laser irradiation device 11a that irradiates the front surface side of the composite material 5 with the laser L, and a second laser irradiation device 11b that irradiates the rear surface side of the composite material 5 with the laser L. The first laser irradiation device 11a emits the laser L for irradiation toward the first scanning optical system 12a. In addition, the second laser irradiation device 11b emits the laser L for irradiation toward the second scanning optical system 12b.

The control unit 15 controls the two laser irradiation devices 11a and 11b, controls each of the two laser irradiation devices 11a and 11b so that the composite material 5 is irradiated with the laser L, or controls any one of the two laser irradiation devices 11a and 11b so that the composite material 5 is irradiated with the laser L.

The laser machining device 30 configured as described above emits the laser L for irradiation from each of the two laser irradiation devices 11a and 11b, and causes the emitted laser L for irradiation to be incident on each of the two scanning optical systems 12a and 12b. The laser machining device 30 changes an irradiation position of the laser L on the rear surface of the composite material 5 by scanning the rear surface of the composite material 5 with the laser L incident on the first scanning optical system 12a. The laser machining device 30 causes the laser L emitted from the first scanning optical system 12a to be incident on the first light condensing optical system 13a, and irradiates the rear surface of the composite material 5 with the condensed laser L. In addition, the laser machining device 30 changes the irradiation position of the laser L on the front surface of the composite material 5 by scanning the front surface of the composite material 5 with the laser L incident on the second scanning optical system 12b. The laser machining device 10 causes the laser L emitted from the second scanning optical system 12b to be incident on the second light condensing optical system 13b, and irradiates the front surface of the composite material 5 with the condensed laser L.

Next, the laser machining method of performing cutting machining for cutting the composite material 5 by using the above-described laser machining device 30 will be described with reference to FIG. 7.

In the laser machining method of Embodiment 2, the composite material 5 is cut by simultaneously irradiating the front surface and the rear surface of the composite material 5 with the lasers L. The cutting-out step and the cutting step are the same as those in Embodiment 1, and thus, description thereof will be omitted. In addition, the first cutout region 25 and the second cutout region 26 which are set in the cutting line C are the same as those in Embodiment 1, and thus, description thereof will be omitted.

As illustrated in FIG. 7, during the cutting machining, the composite material 5 is cut along the cutting line C while the cutting-out step and the cutting step are simultaneously performed from one side (right side in FIG. 7) toward the other side (left side in FIG. 7) in the progress direction of the cutting line C.

Specifically, during the cutting machining, first, the composite material 5 is first irradiated with the laser L by the first laser irradiation device 11a, and performs the cutting-out step on the first cutout region 25 ("1" in FIG. 7) on the right side in FIG. 4 of the cutting line C, thereby forming the first cutout 21. Subsequently, during the cutting machining, the cutting-out step and the cutting step are simultaneously performed. That is, during the cutting machining, the composite material 5 is irradiated with the laser L by the second laser irradiation device 11b, and the cutting step is performed on the second cutout region 26 ("2" on the upper side of FIG. 7) on the right side in FIG. 4 of the cutting line C, that is, the second cutout region 26 at a position facing the first cutout 21, thereby forming the second cutout 22. Simultaneously, during the cutting machining, the cutting-out step is performed on the first cutout region 25 ("2" on the lower side in FIG. 7) adjacent to the first cutout 21 of the cutting line C, thereby forming the first cutout 21. Therefore, in the cutting line C, the cutting-out step is performed prior to the cutting step.

Thereafter, in the cutting step, the cutting step is performed again on the second cutout region 26 ("3" on the upper side in FIG. 7) at the position facing the first cutout 21, thereby forming the second cutout 22. The cutting-out step is performed on the first cutout region 25 ("3" on the lower side in FIG. 7) adjacent to the first cutout 21, thereby forming the first cutout 21. Then, in the cutting step, the cutting-out step and the cutting step are performed a plurality of times (N−1 times). Thereafter, in the Nth time, the cutting step is performed on the second cutout region 26 ("N" on the upper side in FIG. 7) at the position facing the first cutout 21. In this manner, the composite material 5 is cut in the cutting line C.

As described above, according to Embodiment 2, the cutting-out step and the cutting step can be simultaneously performed. Accordingly, the machining speed of the cutting machining can be further improved.

Embodiment 3

Figure 8:
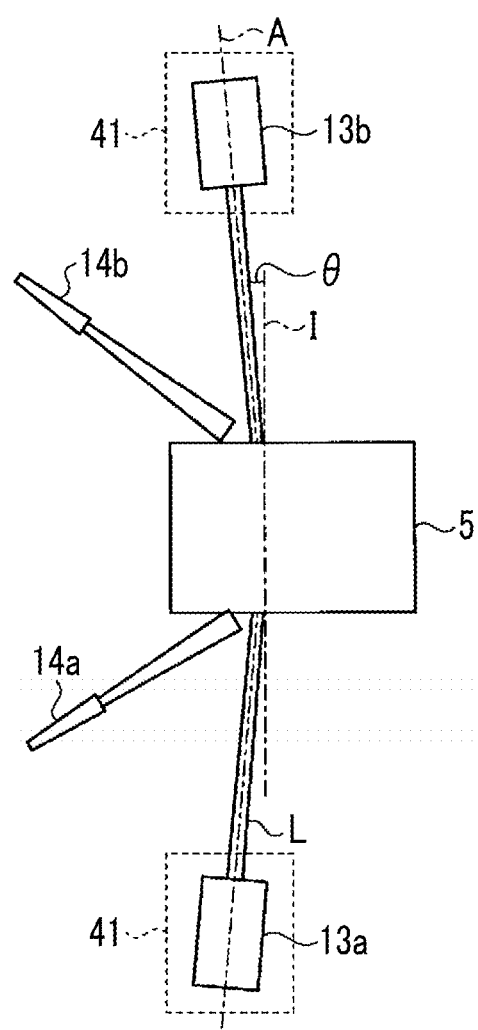
FIG. 8 is a view schematically illustrating a laser machining device according to Embodiment 3.
Figure 9:
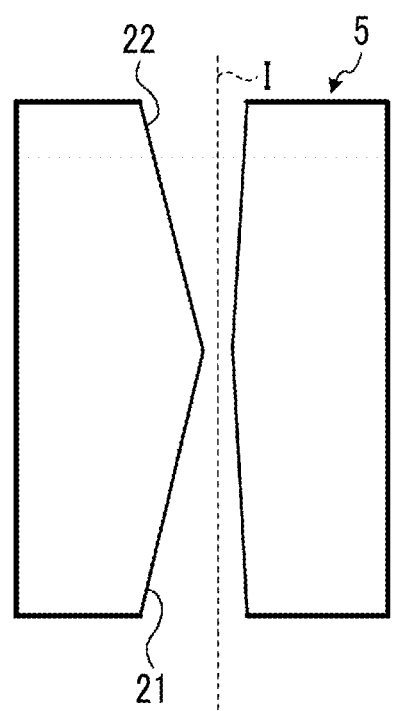
FIG. 9 is a sectional view of a composite material cut by a laser machining method according to Embodiment 3.

Next, a laser machining device and a laser machining method according to Embodiment 3 will be described with reference to FIGS. 8 and 9. In Embodiment 3, in order to avoid repeated description, elements different from those in Embodiments 1 and 2 will be described, and description will be made by assigning the same reference numerals to elements having configurations the same as those in Embodiments 1 and 2. FIG. 8 is a view schematically illustrating the laser machining device according to Embodiment 3. FIG. 9 is a sectional view of a composite material cut by the laser machining method according to Embodiment 3.

In the laser machining devices 10 and 30 and the laser machining method according to Embodiment 1 and Embodiment 2, the irradiation direction (optical axis A) of the laser L emitted for irradiating the front surface and the rear surface of the composite material 5 in the cutting-out step and the cutting step is a direction extending along the thickness direction of the composite material 5. Here, in a case where one side is a product side and the other side is a remaining portion side across the machining line I, when the machining line I is set in a product side end portion, a portion on the product side (front surface side) is removed by the laser. When the machining is performed by sliding a position of the machining line I to be away from the product side in order to avoid the portion on the product side (front surface side) from being removed by the laser, the remaining portion is formed on the product side (rear surface side). Consequently, when a vertical cutting surface is required, it is necessary to perform post processing. Therefore, in the laser machining device and the laser machining method according to Embodiment 3, the irradiation direction (optical axis A) of the laser L emitted for irradiating the front surface and the rear surface of the composite material 5 in the cutting-out step and the cutting step is tilted with respect to the thickness direction of the composite material 5.

A laser machining device 40 of Embodiment 3 further includes a laser tilting unit 41 that relatively tilts the laser L with respect to the composite material 5 in the laser machining device 10 of Embodiment 1. Embodiment 3 adopts a configuration in which the composite material 5 is fixed and the laser L is tilted. However, a configuration may be adopted so that the laser L is fixed and the composite material 5 is movable. The laser tilting unit 41 tilts the laser L with respect to the machining line I by tilting the scanning optical systems 12a and 12b and the light condensing optical systems 13a and 13b. The machining line I is a line set along the thickness direction of the composite material 5. Specifically, the laser tilting unit 41 tilts the optical axis A of the laser L with respect to a depth direction in which the machining line I extends, in a cross section (for example, FIGS. 8 and 9) perpendicular to the progress direction of the cutting line C. The laser tilting unit 41 may physically tilt at least one of the scanning optical systems 12a and 12b and the light condensing optical systems 13a and 13b, or may tilt the laser L by using an optical member included in the scanning optical systems 12a and 12b or the light condensing optical systems 13a and 13b. The laser tilting unit 41 is not particularly limited.

As illustrated in FIG. 8, the laser L tilted by the laser tilting unit 41 is condensed at a predetermined angle θ with respect to the optical axis A. Then, the optical axis A of the laser L is tilted with respect to the depth direction of the machining line I. That is, in view of the predetermined angle θ for condensing the laser L, a tilt angle of the optical axis A is set with respect to the depth direction of the machining line I. The tilt angle is set in a range of 0.1° to 5°, preferably in a range of 0.1° to 2°, and more preferably in a range of 0.1° to 1°.

During the cutting machining of Embodiment 3, in the cutting-out step and the cutting step, the irradiation is performed by causing the laser tilting unit 41 to tilt the laser L with respect to the thickness direction of the composite material 5. In this manner, the cutting surface perpendicular to the cutting line C of the composite material 5 is formed as illustrated in FIG. 9. As illustrated in FIG. 9, the first cutout 21 and the second cutout 22 which are formed along the machining line I are formed in a tapered shape tapered toward the center in the thickness direction of the composite material 5. In this case, as the laser L is tilted, a tapered angle on a tilted side (left side in FIG. 9) is an angle sharper than a tapered angle on a side (right side in FIG. 9) opposite to the tilted side.

Therefore, when a machining surface (surface on the right side in FIG. 9) of a product cut out from the composite material 5 after the cutting machining is set to have a shape along the machining line I, the laser L condensed at the predetermined angle θ with respect to the optical axis A is tilted to form the predetermined angle θ with respect to the machining line I.

As described above, according to Embodiment 3, the irradiation direction (optical axis A) of the laser L is tilted with respect to the machining line I. In this manner, the machining surface can be prevented from being tilted with respect to the machining line I, and the machining surface can be set along the machining line I.

REFERENCE SIGNS LIST

5: Composite material
10: Laser machining device
11: Laser irradiation device
11a, 11b: Laser irradiation device
12a, 12b: Scanning optical system
13a, 13b: Light condensing optical system
14a, 14b: Gas nozzle
15: Control unit
16: Laser switch
17a, 17b: Shielding plate
21: First cutout
22: Second cutout
25: First cutout region
26: Second cutout region
30: Laser machining device (Embodiment 2)
40: Laser machining device
41: Laser tilting unit
T1: First light guide path
T2: Second light guide path
L: Laser
I: Machining line
C: Cutting line
A: Optical axis

The invention claimed is:

1. A laser machining method in which cutting machining for cutting a composite material along a thickness direction is performed by irradiating the composite material with a laser, the laser machining method comprising:
   a cutting-out step of irradiating the composite material with the laser from one side in the thickness direction of the composite material to form a first cutout in the composite material; and
   a cutting step of irradiating the composite material with the laser from the other side in the thickness direction of the composite material to form a second cutout at a position facing the first cutout in the composite material, and cutting the composite material by causing the second cutout to communicate with the first cutout,
   wherein in the cutting-out step, the first cutout is formed by irradiating the composite material with the laser through a plurality of machining paths aligned in a width direction of the first cutout, and in the cutting step, the second cutout is formed by irradiating the composite material with the laser through a plurality of machining paths aligned in a width direction of the second cutout.

2. The laser machining method according to claim 1, wherein the composite material is cut along a cutting line extending in a cutting progress direction, the cutting line includes
  a plurality of first cutout regions set to be aligned in the progress direction in which the cutting line extends, on one side in the thickness direction of the composite material, and
  a plurality of second cutout regions set to be aligned in the progress direction in which the cutting line extends, on the other side in the thickness direction of the composite material, in the cutting-out step, the first cutout is formed by irradiating the first cutout region with the laser, in the cutting step, the second cutout is formed by irradiating the second cutout region with the laser, and the composite material is cut along the cutting line while the cutting-out step and the cutting step are alternately performed from one side toward the other side in the progress direction of the cutting line.

3. The laser machining method according to claim 1, wherein the composite material is cut along a cutting line extending in a cutting progress direction, the cutting line includes
  a plurality of first cutout regions set to be aligned in the progress direction in which the cutting line extends, on one side in the thickness direction of the composite material, and
  a plurality of second cutout regions set to be aligned in the progress direction in which the cutting line extends, on the other side in the thickness direction of the composite material, in the cutting-out step, the first cutout is formed by irradiating the first cutout region with the laser, in the cutting step, the second cutout is formed by irradiating the second cutout region with the laser, and the composite material is cut along the cutting line by simultaneously performing the cutting-out step and the cutting step from one side toward the other side in the progress direction of the cutting line, and performing the cutting-out step prior to the cutting step.

4. The laser machining method according to claim 1, wherein in the cutting step, the composite material is shielded from the laser by a receiving member that receives the laser emitted for irradiation from the other side in the thickness direction of the composite material.

5. The laser machining method according to claim 1, wherein in the composite material, one side in the thickness direction is a lower side, and the other side in the thickness direction is an upper side, in the cutting-out step, the laser is emitted for irradiation from the lower side toward the upper side in the thickness direction of the composite material, and in the cutting step, the laser is emitted for irradiation from the upper side toward the lower side in the thickness direction of the composite material.

6. The laser machining method according to claim 1, wherein the composite material is cut along a cutting line extending in a cutting progress direction, a machining line is set along the thickness direction of the composite material, and during the cutting machining, an irradiation direction of the laser is tilted with respect to the machining line set in the composite material, in a cross section perpendicular to the progress direction.

7. A laser machining device that performs cutting machining for cutting a composite material along a thickness direction by irradiating the composite material with a laser, the laser machining device comprising:
  a laser irradiation unit that irradiates the composite material with the laser;
  a first laser head that irradiates the composite material with the laser emitted for irradiation from the laser irradiation unit from one side in the thickness direction of the composite material;
  a second laser head that irradiates the composite material with the laser emitted for irradiation from the laser irradiation unit from the other side in the thickness direction of the composite material;
  a laser switch that switches the laser emitted for irradiation from the laser irradiation unit between the first laser head and the second laser head;
  a first laser scanner that scans the composite material with the laser emitted for irradiation from the first laser head;
  a second laser scanner that scans the composite material with the laser emitted for irradiation from the second laser head; and
  a control unit that controls the irradiation of the laser, wherein the control unit performs a cutting-out step of forming a first cutout in the composite material by causing the laser switch to switch the laser to the first laser head, and irradiating the composite material with the laser from the first laser head, and a cutting step of cutting the composite material by causing the laser switch to switch the laser to the second laser head, irradiating the composite material with the laser from the second laser head, forming a second cutout at a position facing the first cutout in the composite material, and causing the second cutout to communicate with the first cutout, in the cutting-out step, the first cutout is formed by irradiating the composite material with the laser through a plurality of machining paths aligned in a width direction of the first cutout, and in the cutting step, the second cutout is formed by irradiating the composite material with the laser through a plurality of machining paths aligned in a width direction of the second cutout.

8. The laser machining device according to claim 7, wherein the composite material is cut along a cutting line extending in a cutting progress direction, the cutting line includes
  a plurality of first cutout regions set to be aligned in the progress direction in which the cutting line extends, on one side in the thickness direction of the composite material, and
  a plurality of second cutout regions set to be aligned in the progress direction in which the cutting line extends, on the other side in the thickness direction of the composite material, in the cutting-out step, the first cutout is formed by irradiating the first cutout region with the laser, in the cutting step, the second cutout is formed by irradiating the second cutout region with the laser, and the control unit cuts the composite material along the cutting line while alternately performing the cutting-out step and the cutting step from one side toward the other side in the progress direction of the cutting line by causing the laser switch to alternately switch between the first laser head and the second laser head.

9. A laser machining device that performs cutting machining for cutting a composite material along a thickness direction by irradiating the composite material with a laser, the laser machining device comprising:
two laser irradiation units that irradiate the composite material with the laser;
a first laser head that irradiates the composite material with the laser emitted for irradiation from one of the laser irradiation units from one side in the thickness direction of the composite material;
a second laser head that irradiates the composite material with the laser emitted for irradiation from the other of the laser irradiation units from the other side in the thickness direction of the composite material;
a first laser scanner that scans the composite material with the laser emitted for irradiation from the first laser head;
a second laser scanner that scans the composite material with the laser emitted for irradiation from the second laser head; and
a control unit that controls the irradiation of the laser,
wherein the control unit performs a cutting-out step of forming a first cutout in the composite material by causing the first laser head to irradiate the composite material with the laser emitted from one of the laser irradiation units, and a cutting step of cutting the composite material by causing the second laser head to irradiate the composite material with the laser emitted from the other of the laser irradiation units, forming a second cutout at a position facing the first cutout in the composite material, and causing the second cutout to communicate with the first cutout,
in the cutting-out step, the first cutout is formed by irradiating the composite material with the laser through a plurality of machining paths aligned in a width direction of the first cutout, and
in the cutting step, the second cutout is formed by irradiating the composite material with the laser through a plurality of machining paths aligned in a width direction of the second cutout.

10. The laser machining device according to claim 9,
wherein the composite material is cut along a cutting line extending in a cutting progress direction,
the cutting line includes
a plurality of first cutout regions set to be aligned in the progress direction in which the cutting line extends, on one side in the thickness direction of the composite material, and
a plurality of second cutout regions set to be aligned in the progress direction in which the cutting line extends, on the other side in the thickness direction of the composite material,
in the cutting-out step, the first cutout is formed by irradiating the first cutout region with the laser,
in the cutting step, the second cutout is formed by irradiating the second cutout region with the laser, and
the control unit cuts the composite material along the cutting line by causing the first laser head and the second laser head to irradiate the composite material with the laser, simultaneously performing the cutting-out step and the cutting step from one side toward the other side in the progress direction of the cutting line, and performing the cutting-out step prior to the cutting step.

11. The laser machining device according to claim 7,
wherein the composite material is cut along a cutting line extending in a cutting progress direction, and a machining line is set along the thickness direction of the composite material, and
the laser machining device further comprises a laser tilting unit that tilts an irradiation direction of the laser with respect to the machining line set in the composite material, in a cross section perpendicular to the progress direction.

12. The laser machining device according to claim 9,
wherein the composite material is cut along a cutting line extending in a cutting progress direction, and a machining line is set along the thickness direction of the composite material, and
the laser machining device further comprises a laser tilting unit that tilts an irradiation direction of the laser with respect to the machining line set in the composite material, in a cross section perpendicular to the progress direction.

* * * * *